US007535278B1

(12) United States Patent  (10) Patent No.: US 7,535,278 B1
Ondris et al.  (45) Date of Patent: May 19, 2009

(54) CIRCUITS AND METHODS OF USING PARALLEL COUNTER CONTROLLED DELAY LINES TO GENERATE A CLOCK SIGNAL

(75) Inventors: Robert M. Ondris, Sunnyvale, CA (US); Raymond C. Pang, San Jose, CA (US); Kwansuhk Oh, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 192 days.

(21) Appl. No.: 11/717,810

(22) Filed: Mar. 13, 2007

(51) Int. Cl.
*G06F 1/04* (2006.01)
*H03H 11/26* (2006.01)

(52) U.S. Cl. .................. 327/291; 327/293; 327/295; 327/265; 327/269

(58) Field of Classification Search .............. 327/261, 327/263, 265, 266, 276, 279, 280, 284, 291–293, 327/295
See application file for complete search history.

(56) References Cited

U.S. PATENT DOCUMENTS

| | | | |
|---|---|---|---|
| 5,744,992 A * | 4/1998 | Baumann | ...................... 327/241 |
| 6,384,647 B1 | 5/2002 | Logue | |
| 6,445,232 B1 | 9/2002 | Logue et al. | |
| 6,531,906 B2 * | 3/2003 | Gardei et al. | ................ 327/276 |
| 6,587,534 B2 | 7/2003 | Hassoun et al. | |
| 6,788,120 B1 | 9/2004 | Nguyen | |
| 6,906,562 B1 | 6/2005 | Nguyen | |
| 6,906,571 B1 | 6/2005 | Nguyen | |
| 6,914,460 B1 | 7/2005 | Nguyen | |
| 6,924,684 B1 | 8/2005 | Nguyen | |
| 7,005,900 B1 | 2/2006 | Nguyen | |
| 7,071,751 B1 | 7/2006 | Kaviani | |
| 7,139,361 B1 | 11/2006 | Nguyen | |

OTHER PUBLICATIONS

Xilinx, Inc.; U.S. Appl. No. 10/792,055 by Lu filed Mar. 2, 2004.
Xilinx, Inc.; U.S. Appl. No. 11/179,273 by Nguyen filed Jul. 12, 2005.

* cited by examiner

*Primary Examiner*—Quan Tra
*Assistant Examiner*—Colleen O'Toole
(74) *Attorney, Agent, or Firm*—Thomas A. Ward; Lois D. Carter

(57) ABSTRACT

A clock manager circuit includes a number of clock output blocks, each providing an independent output. Counter controlled delay devices (CCDs) are used in these clock output blocks. To achieve full cycle delays, the CCDs are placed in parallel with outputs of the CCD outputs driving set and reset terminals of a common latch. The parallel connection of the CCDs, as opposed to a series connection, offers an increase in maximum frequency and possibly fewer needed CCDs than if the CCDs are placed in series. In one embodiment, at least one of the CCDs includes a counter/compare circuit with a frequency divider enabling the frequency of the CCD to be varied relative to the common input clock.

11 Claims, 8 Drawing Sheets

CIRCUITS AND METHODS OF USING PARALLEL COUNTER CONTROLLED DELAY LINES TO GENERATE A CLOCK SIGNAL

FIELD OF THE INVENTION

The present invention relates to clock management circuits and methods. More particularly, the present invention relates to a clock management circuit that provides a number of clock outputs with different phases set relative to a common input clock, and optionally different frequencies relative to the input clock.

BACKGROUND

A clock manager circuit or clock phase shifter can form part of a delay lock loop (DLL) or a digital frequency synthesizer (DFS), for example. DLLs and DFSes are commonly used in programmable logic circuits (PLDs), such as Field Programmable Gate Arrays (FPGAs). They may also be used in other devices such as Application Specific Integrated Circuits (ASICs) or processors that include or can be programmed to include multiple modules or nodes requiring clocks of different phases, all synchronized to a common clock frequency.

Previous versions of clock manager circuits create clock signals having fixed phases relative to a reference clock oscillator. The clock signals are typically multiplexed to allow selection of a desired phase. Since the phases are otherwise not usually configurable, granularity in the available phases is created. The granularity is created since the clock signal outputs available allow selection of staggered phase shifts in steps on the order of only ¼ or ⅛ of the reference clock oscillator-frequency.

FIG. 1 shows components of a clock manager, or clock phase shifter circuit. The circuit initially includes delay blocks $2_1$-$2_5$ that receive a common clock signal input (CLK). The delay blocks can be made up of tap coupled delay (TCD) devices with delay components such as delay lines or inverters connected in series and tap outputs provided at different points along the series connections. Additionally or alternatively, the delay blocks $2_1$-$2_5$ can be made up of counter controlled delay devices (CCDs) that include a counter clocked by the input clock with overflow of the counter providing the delay output, with the count overflow point set to control the desired phase shift from the input clock. Programmable frequencies in the past have been created by placing the delay block, including either a TCD or CCD, inside a larger loop that runs at the desired output frequency. Prior counter controlled delay line architectures typically involved placing each CCD in series to achieve less granularity. The maximum operation frequency was then limited by the intrinsic delay of the delay block and any other blocks in the loop or series connection.

Five delay blocks $2_1$-$2_5$ are shown in FIG. 1. The first four $2_1$-$2_4$ provide output signals with phase shifts at ¼ intervals of the phase of the input clock CLK, the phases being labeled p0, p25, p50 and p75 to indicate the intervals. The final delay block $2_5$ provides a 360 degree phase shift from the first block $2_1$. The outputs of the first and last delay blocks $2_1$ and $2_5$ are connected to phase detector 4 to provide a synchronization signal (Sync Signal) for phase synchronization.

The outputs of the delay blocks $2_1$-$2_4$ that provide ¼ phase intervals from the input clock CLK are then provided to an output generator 6. The output generator 6 uses the clock outputs from blocks $2_1$-$2_4$ to provide the four fixed phase shifted outputs of the clock manager circuit (Output Clocks) each with a 50% duty cycle. For example, signal p25 creates the rising edge and signal p75 creates the falling edge for a 90 degree phase shifted output.

It would be desirable to have a clock manager circuit with less granularity, particularly in a device like an FPGA that can be programmed to include multiple modules, each using a different phase of a common clock. It would further be desirable to provide less granularity without placing additional limits on the maximum output frequency.

SUMMARY

According to embodiments of the present invention, a clock management circuit is provided that allows a number of clock outputs, each with an independently controllable phase and duty cycle relative to the input clock. The clock manager circuit further optionally allows controlling the output frequency to be a different frequency than that of the common input clock.

A clock manager circuit according to embodiments of the present invention includes a number of clock output blocks each providing an independent output. In one embodiment, counter controlled delay devices (CCDs) are used in these clock output blocks, because of their small size. To achieve full cycle delays, the CCDs are placed in parallel, with outputs of the CCD driving set and reset terminals of a common latch. The parallel connection of the CCDs, as opposed to a series connection, offers an increase in maximum frequency and possibly fewer needed CCDs than if the CCDs are placed in series.

In one embodiment, each CCD includes a simple counter, a flip-flop and a delay line element to count until overflow occurs. A latch interconnecting the CCDs in each clock output block interleaves the CCD signals to provide a combined interleaved output with less granularity than single CCDs allow. Latches may provide a single set and reset input with two CCDs used, or multiple set and reset inputs with more CCDs available in each clock output block.

In another embodiment, each CCD includes a combined counter/comparator circuit. A compare value is used to control the counter/comparator overflow output to desired values. A register makes the compare value variable. The combined counter and compare circuit enables the frequency of the CCD to be varied relative to the common input clock with a frequency divider provided at the input of the CCD.

Prior CCD architectures involved placing each CCD in series. With a fixed reset time, this may require more CCDs to be used in order to achieve a specified delay than by placing them in parallel. Therefore, the number of CCDs may be reduced using this architecture, which saves area. Additionally, for the same number of CCDs and the same reset time, the maximum frequency supported may be higher using this architecture.

BRIEF DESCRIPTION OF THE DRAWINGS

Further details of the present invention are explained with the help of the attached drawings, in which.

DETAILED DESCRIPTION

Figure 1:
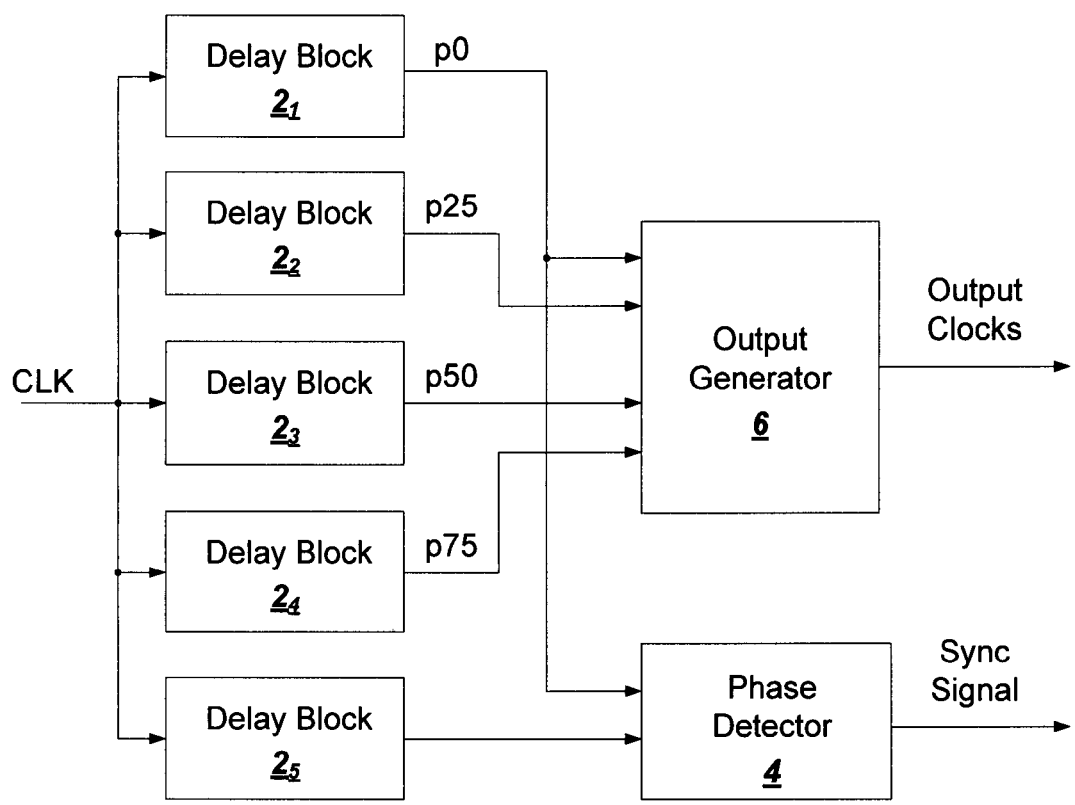
FIG. 1 is a block diagram showing components of a conventional clock management circuit.
Figure 2:
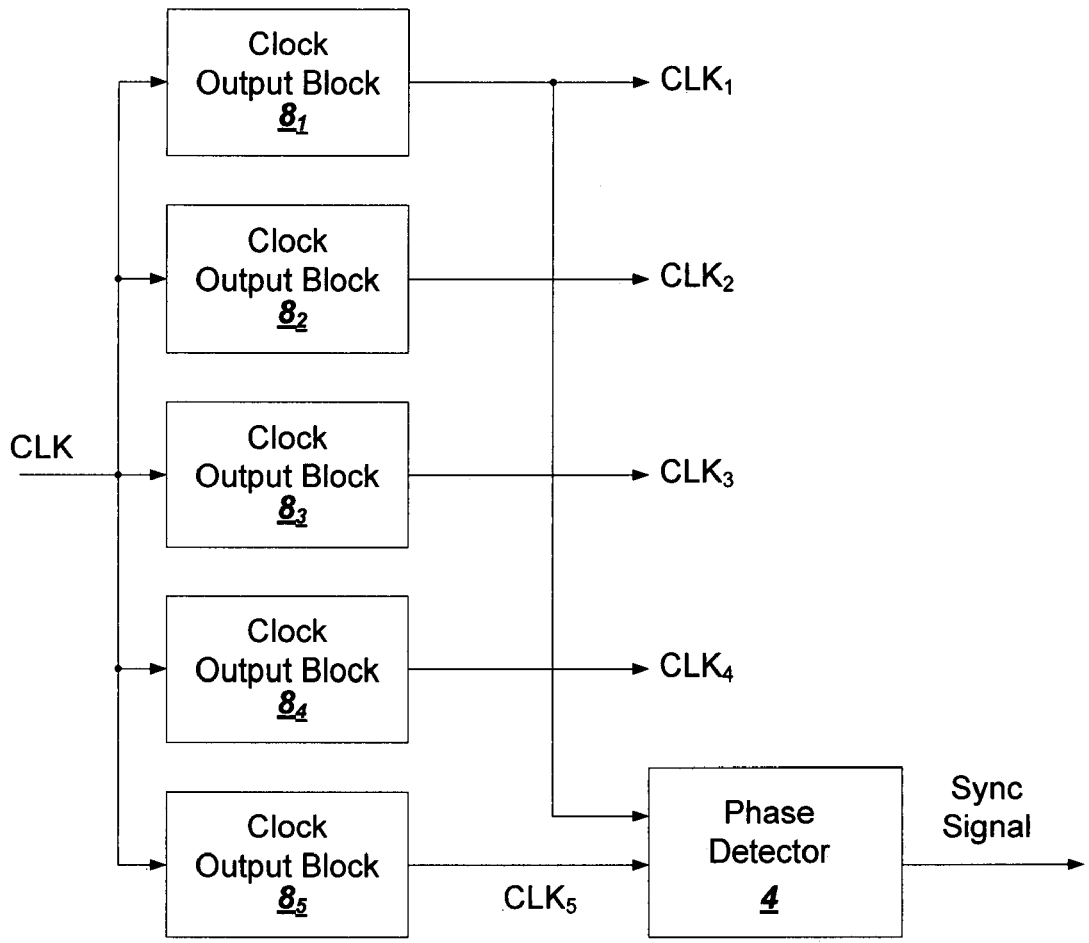
FIG. 2 shows a block diagram of components used in a clock management circuit in accordance with embodiments of the present invention.

FIG. 2 shows a block diagram of components used in a clock management circuit in accordance with embodiments of the present invention. FIG. 2 replaces the delay blocks of FIG. 1 with clock output blocks $8_1$-$8_5$. The output generator 6 shown in FIG. 1 is not needed. The clock output blocks have outputs labeled $CLK_1$-$CLK_5$ illustrating that the phase of each clock is adjustable, rather than a fixed ¼ phase shift relative to the input clock as in FIG. 1. The $CLK_1$ output generates a non-phase shifted output. The $CLK_5$ signal is a 360 degree, in other words full cycle, phase shifted signal from $CLK_1$. The $CLK_1$ and $CLK_5$ signals are provided to phase detector 4 to maintain synchronization as in FIG. 1. For convenience, components carried over from FIG. 1 to FIG. 2 are similarly labeled, as are components carried over in subsequent drawings.

Figure 3:
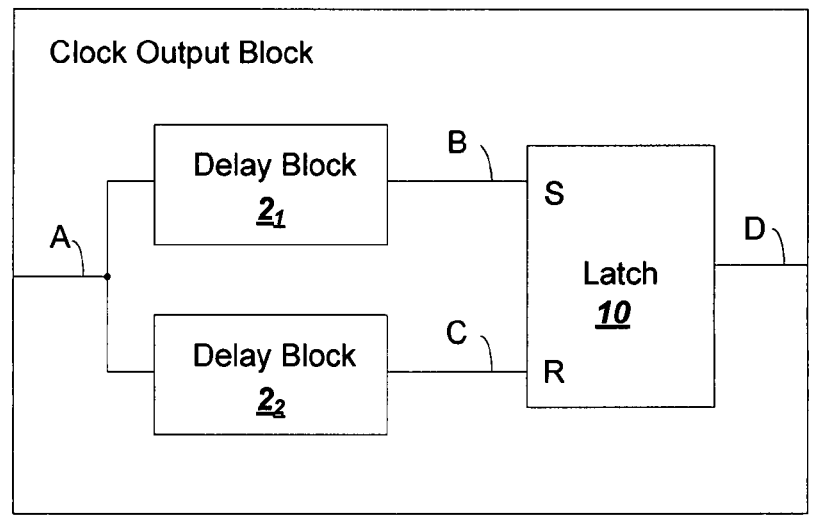
FIG. 3 illustrates one embodiment of components of a clock output block from FIG. 2.

FIG. 3 illustrates one embodiment of components that can be used in each of the clock output blocks $8_1$-$8_5$ from FIG. 2. As shown, the clock output block includes two delay blocks $2_1$ and $2_2$ having inputs receiving a common clock and outputs provided to a set-reset (SR) latch 10. By delaying the edge that goes to the reset (R) input of the SR latch 10, a clock output from the SR latch 10 is generated with a high time equal to the delay difference between the edges of the outputs of the two delay blocks $2_1$ and $2_2$. In one embodiment, the delay blocks $2_1$ and $2_2$ are formed by CCDs.

Figure 4:
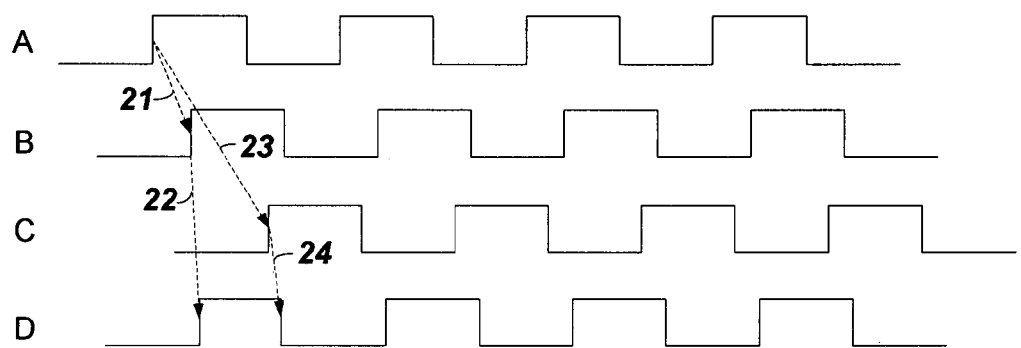
FIG. 4 illustrates signals at different points in the block diagram of FIG. 3.

FIG. 4 illustrates signals occurring at points A-D in the block diagram of FIG. 3. Signal A shows the common input clock to the delay blocks $2_1$ and $2_2$. Delay block $2_1$ provides a signal B delayed a desired amount relative to the input clock signal A. Signal B drives the set (S) input to the SR latch 10. The delay block $2_2$ introduces a further delay to the common signal A to form signal C that is provided to the reset (R) input of the SR latch 10. The output signal D from the SR latch 10 then transitions to show the difference between the rising edges of the two output signals B and C. Line 21 shows the delay between common clock signal A and the output of a delay block B, while line 23 shows the delay between the common clock A and delay block providing signal C. Line 22 illustrates how the rising edge of signal B creates a first transition of signal D, while line 24 illustrates how the rising edge of signal C creates the second transition of signal D. The signals B and C can have a degree phase shift programmably set to control delay between their rising edges relative to the common clock A by x/360*Ncycle, where x is the degrees of phase shift and Ncycle is the number of clock cycles of an oscillator in a CCD that are equivalent to one cycle of the input clock. The falling edges of the signals B and C are each delayed by (x/360+DC)*Ncycle, where DC is the desired duty cycle expressed as a fraction.

Figure 5:
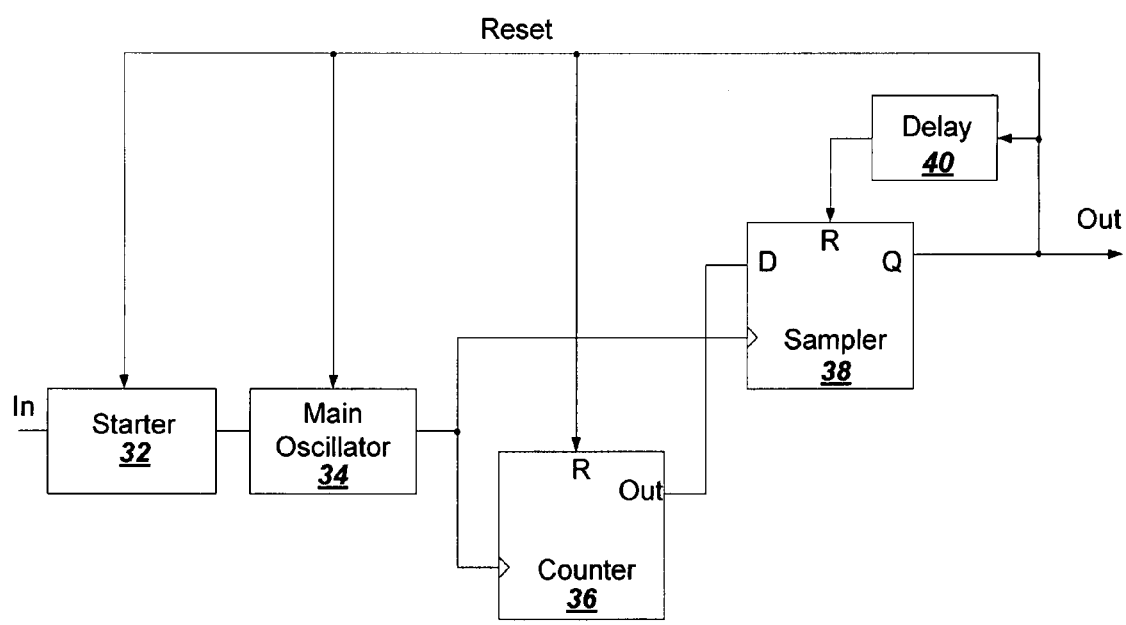
FIG. 5 shows one embodiment of circuitry for a CCD.

FIG. 5 shows one embodiment of circuitry for a CCD that can be used, for example, as one of the delay blocks $2_1$-$2_2$ of FIG. 3. The CCD circuitry shown in FIG. 5 includes a starter 32, main oscillator 34, counter 36, sampler 38 and delay element 40. The starter 32 is driven by a common clock input (In) that provides a clock operating at a lower frequency than the main oscillator 34. The clock signal produced from the main oscillator 34 begins when a signal is received from the starter 32. The counter 36 receives a clock input from the main oscillator 34. The counter 36 circuit in one embodiment includes an accumulator that provides an overflow on the output (Out) after a set number of clock cycles from the main oscillator. A reset signal is provided to each of the starter 32, main oscillator 34, and counter 36 to restart the counting process once the output (Out) of the CCD of FIG. 5 changes state.

The sampler 38 of FIG. 5 in one embodiment is a D-type flip-flop, but can be formed from another type of register. The D input of sampler 38 is provided by the overflow output from counter 36. The sampler 38 is clocked by the main oscillator, so its Q output will transition when the counter 36 overflows. The Q output of the sampler 38 provides the CCD output, and is also fed back through a delay element 40 to the reset input of sampler 38. The sampler 38 will thus reset and transition its Q output back depending on the delay provided through delay element 40. The delay element 40 can be a delay line, or other component set to provide a desired delay. The delay time of delay element 40 will control the duty cycle of the CCD.

The CCD described herein is advantageous to use because of its relatively small size compared to the tap controlled delay line (TCD). Another CCD that can be used, for example, is described by Kaviani in U.S. Pat. No. 7,071,751, entitled "Counter-Controlled Delay Line" and issued Jul. 4, 2006, which is incorporated herein by reference. When the CCD circuit of FIG. 5 forms the entire delay block, the maximum delay, DBseries, is equal to the period of the common clock signal going to the delay block, TBseries, minus the reset time, R, as controlled by the delay block 40. This is expressed as follows:

$$DBseries=TBseries-R$$

To get a longer delay, multiple CCDs can be placed in series. The longer delay results since the total delay, DT, would be the number of CCDs, n, times the delay of one CCD block:

$$DTseries=n*DBseries$$

Each CCD in series still receives the same period input clock as that of the common input clock, TI. Thus, the total block delay in series will equal the common input clock period, TBseries=TI. Therefore, the maximum total delay is:

$$DTseries=n*(TI-R)$$

However, placing the CCDs in parallel can allow for fewer CCDs to be used. Further, parallel CCDs allow for a higher input frequency than a series of CCDs. This will be shown by going through similar analysis for parallel CCDs. With the CCDs in parallel and connected to a latch, the resulting delay is due to triggering of an output on every rising edge of the input clock from one of the n CCDs connected to the latch. Since each individual CCD is only responsible for delaying one out of n rising edges of the input clock, the input clock period of each CCD is n times the input clock period of the parallel CCD structure. Therefore:

$$TBparallel=n*TI$$

The total delay in parallel is the same as the delay of each block, DTparallel=DBparallel. The maximum total delay in parallel can, thus, be written as follows:

$$DTparallel=nTI-R$$

Comparing DTparallel to the equation for DTseries, the maximum total delay is more by (n−1)*R. This can be seen from the difference in the equations for DTparallel and DTseries as follows:

$$DTparallel-DTseries=(n-1)*R$$

Therefore, when a specified delay is necessary, the parallel connection of CCDs will take the same or fewer delay blocks to implement. Fewer delay blocks results in significant area savings on an integrated circuit.

The parallel connection of CCDs further allows operation of a delay block at higher frequencies. In general, total delay of a delay block, DT, can be written as a number (not necessarily an integer), y, of input clock periods DT=y*TI. Thus, the equations for minimum input period of series and parallel architectures respectively are:

$$TIseries=n*R/(n-y); \text{ and}$$

$$TIparallel=R/(n-y).$$

As expected, the parallel architecture can operate at n times the frequency of the series architecture.

As an example, in one architecture a full cycle delay is desired. Therefore, using the parallel architecture:

$$TImin=R/(n-1)$$

where TImin is the minimum period of input clock signal. Therefore, at least 2 blocks (per edge) are necessary, which would result in Tmin=R. FIG. 3 shows two such delay blocks $2_1$ and $2_2$ driving a latch 10.

Figure 6:
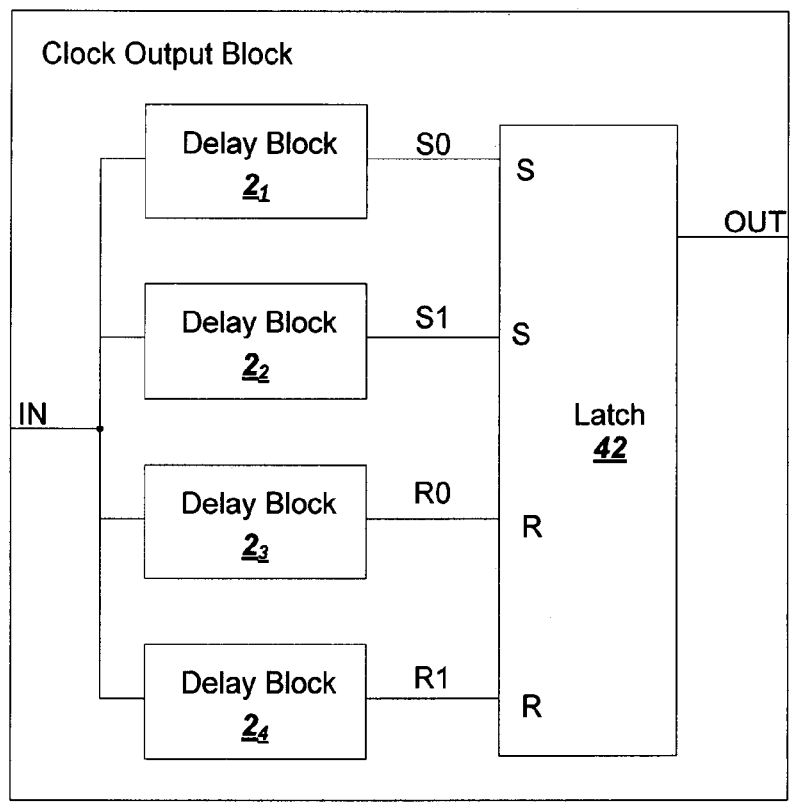
FIG. 6 shows an alternative embodiment of components of a clock output block from FIG. 3 with multiple delay blocks driving a latch.

FIG. 6 shows an alternative embodiment of components of a clock output block from FIG. 3 with more than two delay blocks $2_1$-$2_4$ driving the latch 42. In contrast with the latch 10 of FIG. 3 that includes a single set (S) and reset (R) input, the latch 42 of FIG. 6 includes two of each of the S and R inputs that receive inputs from the four delay blocks $2_1$-$2_4$. Although the latch 42 is shown with two S and R inputs, it is understood that latches with more inputs can be provided if more parallel connected delay blocks are desired in a clock output block. For the clock output block of FIG. 6, the four delay blocks $2_1$-$2_4$ have inputs receiving a common input clock (IN) and outputs S0, S1, R0 and R1 provided to the SR latch 42. By providing a different delay for each of the inputs S0, S1, R0 and R1 relative to the common clock, a clock output (OUT) from the SR latch 42 is generated with a high time equal to the delay difference between the edges of its inputs.

Figure 7:
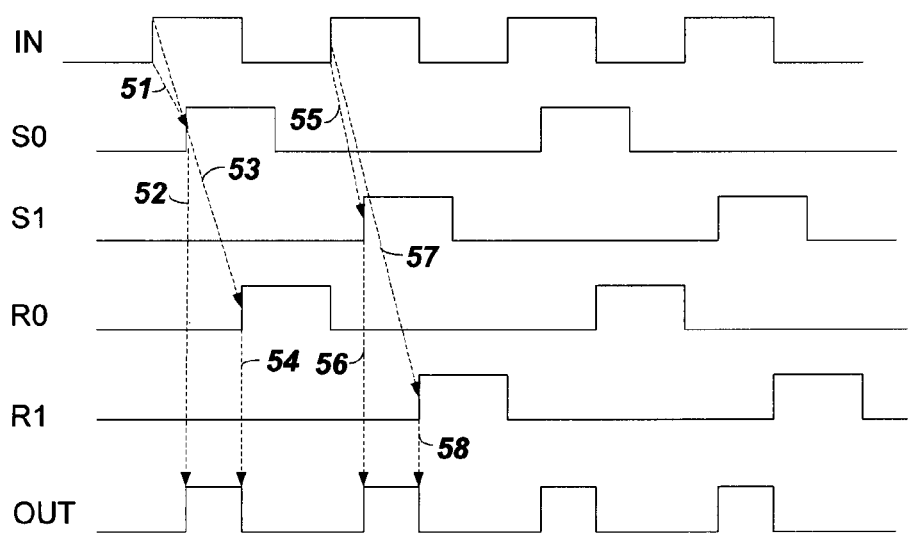
FIG. 7 illustrates signals at different points in the block diagram of FIG. 6.

FIG. 7 illustrates signals IN, S0, S1, R0, R1 and OUT from the circuit diagram of FIG. 6. Signal IN shows the common input clock to the delay blocks $2_1$-$2_4$. Delay block $2_1$ provides the S0 signal to the first set input to the SR latch 42 delayed a desired amount relative to the input clock signal IN, as shown by line 51. The delay block $2_3$ introduces a further delay relative to the IN signal, as shown by line 53, but not longer than one clock cycle to allow formation of the signal R0 that is provided to the first reset input of the SR latch 42. The output signal OUT then initially transitions at the leading edges of the S0 and R0 signals as illustrated by the lines 52 and 54.

The delay block $2_2$ provides the second latch set input S1 and is delayed to transition after the rising edge of the IN signal following the S0 set input. This is illustrated by line 55 in FIG. 7. Similarly, the second reset input R1 is delayed to transition after the rising edge of the IN signal following the S1 signal, as illustrated by line 57. The rising edges of the S1 and R1 signals cause the next transitions of the OUT signal. By using four delay blocks instead of two, the system of FIG. 6 provides a shorter pulse period and reduced delay for pulses provided than the system of FIG. 3.

Figure 8:
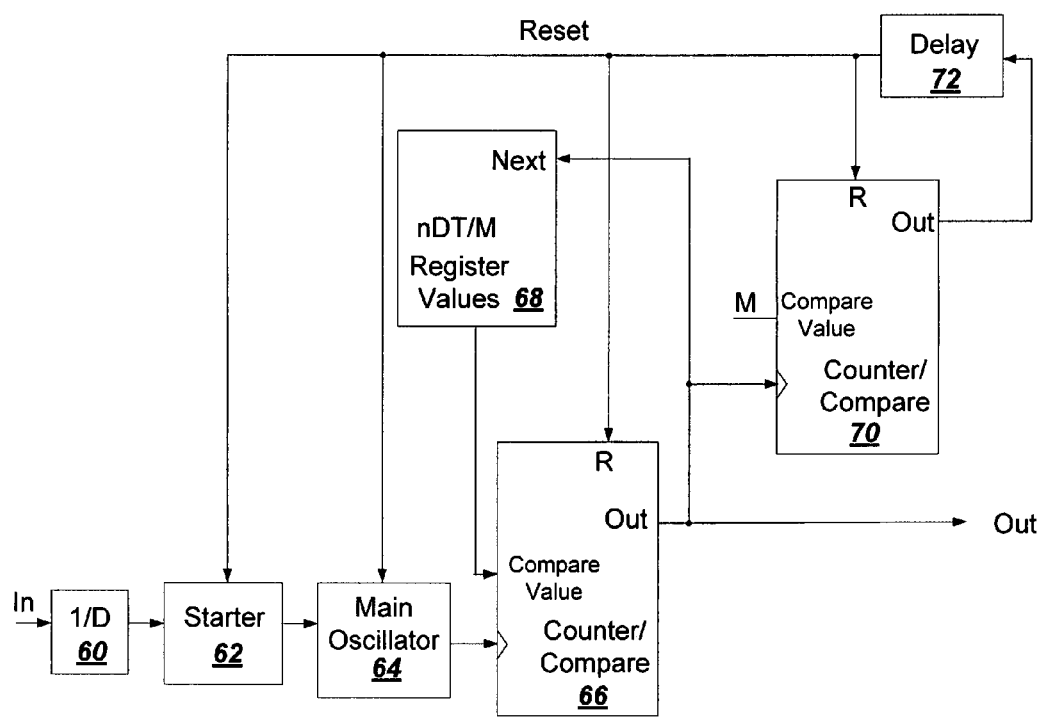
FIG. 8 shows another embodiment of circuitry for a CCD enabling selectable frequency variation.

FIG. 8 shows another embodiment of circuitry for a CCD enabling selectable frequency variation. The CCD circuitry shown in FIG. 8 includes a frequency divider 60, starter 62, main oscillator 64, counter/compare circuits 66 and 70, registers 68; and delay element 72. The input clock (In) has its frequency divided by D. D is a user input programmed to the frequency divider 60 control to select the desired output frequency. The starter 62 is then driven by the output of frequency divider 60 to trigger the main oscillator 64. The main oscillator 64 operates at a higher frequency than the input clock In. The counter/compare circuit 66 receives a clock input from a main oscillator 64.

The counter/compare circuit 66 in one embodiment includes an accumulator that clocks each clock cycle, and a comparator that compares the input clock signal to a compare value input. More details of the counter/compare circuit 66 will be described subsequently with reference to FIG. 9. The compare value input to counter/compare circuit 66 is provided from register 68, and the counter/compare circuit 66 provides an output (Out) transition when the count and compare value match. The compare value register 68 stores the main oscillator cycle count equivalent to nDT/M, where D is the frequency value of frequency divider 60, M is a multiply value and T is the input (In) clock period, and n is an integer.

The output (Out) from the counter/compare circuit 66 provides the output of the CCD, as well as a clock input to another counter/compare circuit 70. The counter/compare circuit 70 receives a compare value input of M. M is a desired multiply value programmed by a user that is used in register 68. The number M will determine the number of times the output OUT is transitioned before the circuit is reset. The delay element 72 connects the output of the second counter/compare circuit 70 to the reset inputs of the circuits 62, 64, 66 and 70 to set the delay.

The CCD creates an output pulse after its intrinsic delay and then every DT/M seconds, where T is the input clock period from the main oscillator 64, D is the division value in frequency divider 60 and M is the multiply value applied to the compare value input of counter/comparator 70. The pulses are created by going to a count whose delay is equivalent to DT/M. The delay or pulse period can be calculated as DNcycle/M, where Ncycle is the delay for one period of the input clock (In) as described above. Otherwise, the pulse period can be set by starting at a count and adjusting until the right count is reached, determined by the output clock reaching the desired frequency, and using that value in register 68. Once DT/M is determined and the circuit is operating, the main oscillator 64 of the CCD and the counter/compare circuits 66 and 70 are not reset until after M counts. The compare value used by the register 68 becomes equivalent to 2DT/M for the next pulse (illustrated by the n in the equation nDT/M in FIG. 8). Next the comparator value becomes equivalent to 3DT/M and so on for a total of M pulses being generated before reset occurs.

Figure 9:
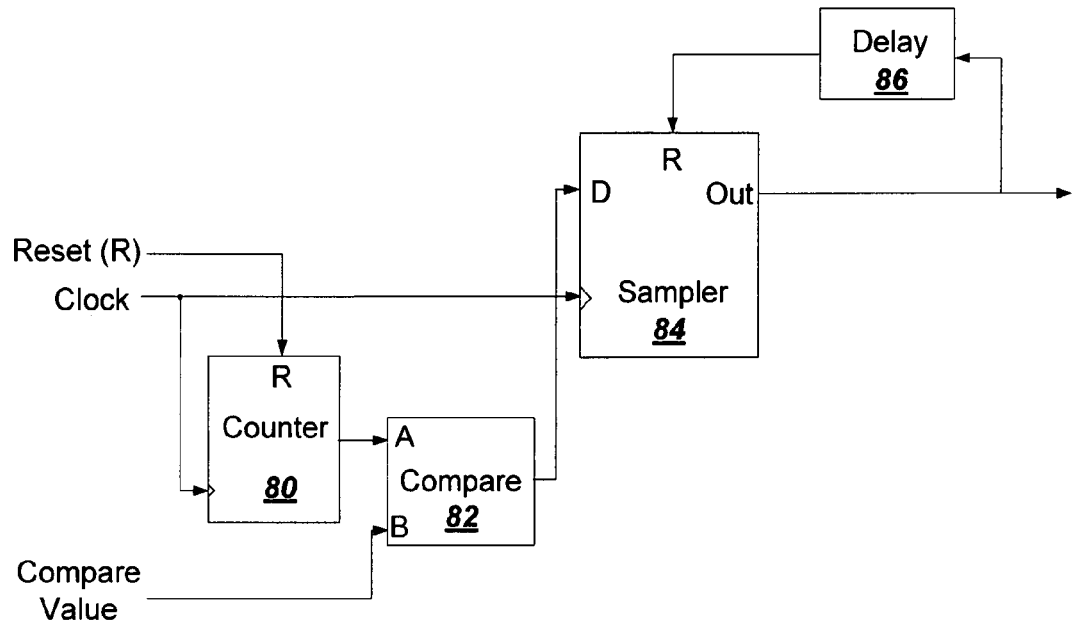
FIG. 9 shows one embodiment of components of a counter/compare circuit of FIG. 8.

FIG. 9 shows components of one embodiment for the counter/compare circuits 66 and 70 of FIG. 8. The circuit includes a counter 80, a comparator 82, a sampler (e.g., a D-type flip-flop) 84 and delay element 86. The comparator 82 receives inputs from the compare value input to the counter/compare circuit, and from the counter 80. The counter 80 is clocked by the clock input to the counter/compare circuit. The counter 80 further receives the reset to the counter/compare circuit. The output of comparator 82 is provided to the D input of sampler 84, and the sampler 84 is clocked by the input clock to the counter/compare circuit. The output of the sampler 84 provides the output of the counter/compare circuit, and is provided through the delay element 86 to the reset of the sampler 84 to control the pulse width of the signal output from the overall counter compare circuit.

If a higher frequency is needed than supported by the one-CCD scheme, multiple CCDs as shown in FIG. 8 can be used in parallel configuration, e.g., as shown in FIGS. 3 and 6. For example, in a two-CCD implementation, one CCD can generate rising edges of the output pulse, while the other CCD generates the falling edges (again allowing for a variable duty cycle). It might be desirable to interleave multiple CCDs since the main oscillator and counter need to be reset and there may not be enough time to complete the reset before a new input clock edge arrives.

Figure 10:
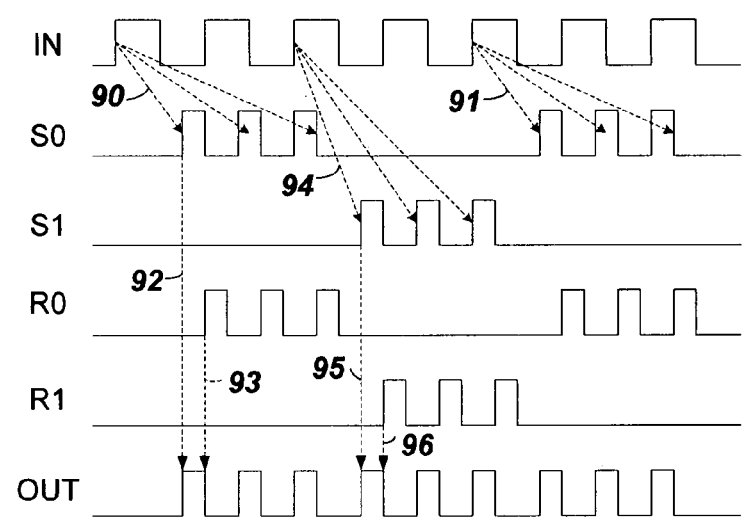
FIG. 10 shows signals at different points in the block diagram of FIG. 6 with CCDs provided in the clock output blocks as shown in FIG. 8 enabling selectable frequency variation.

FIG. 10 shows signals at different points in the block diagram of FIG. 6 with CCDs having circuitry shown in FIG. 8 used in the delay blocks, in other words interleaving CCDs capable of selectable frequency. In this exemplary embodiment, the values of M and D are set with M=3 and D=2 in the CCDs. As shown in FIG. 10, the first set input S0 has outputs transitioning at the first edge of the input clock (IN), and set input S1 has outputs transitioning two input clock cycles later, since D=2. The transitions of S0 relative to IN are shown by lines 90, while the transitions of S1 relative to IN are shown by lines 94. The S0 signal cycles three times with M=3, and then waits for another two input clock cycles before cycling three times again. The transitions of S0 two input clock cycles later relative to IN are shown by lines 91. The rising edge of the S0 and R0 signals creates a pulse of the output signal OUT, as illustrated by lines 92 and 93. Similarly, the rising edge of the S1 and R1 signals create a pulse of the signal OUT, as illustrated by lines 95 and 96.

Figure 11:
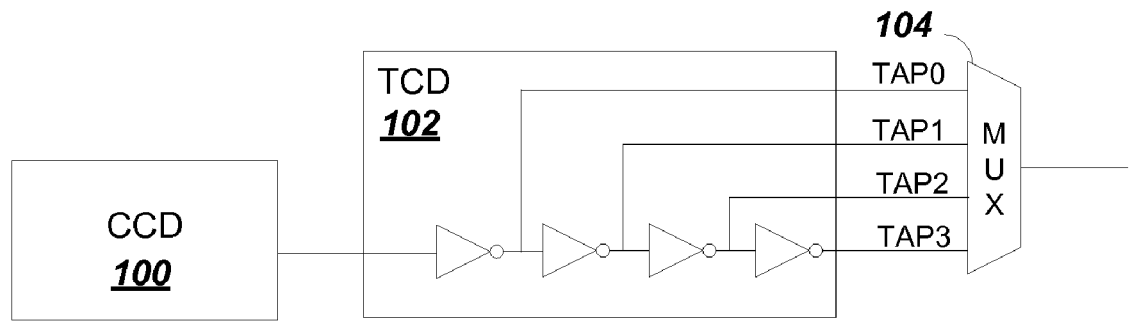
FIG. 11 illustrates an embodiment of a mid-trim unit to provide fine granularity adjustment to account for limitations in oscillator start time.
Figure 12:
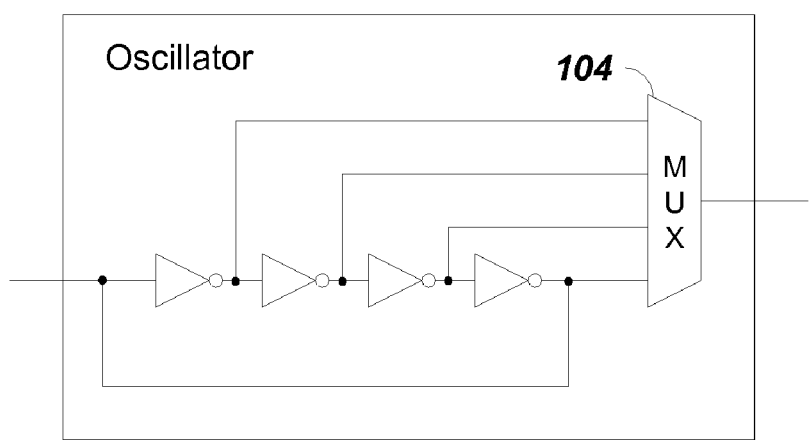
FIG. 12 illustrates a further embodiment of a mid-trim unit.

Since the main oscillator, such as main oscillator 64 of FIG. 8, cannot be started at different points for each count, the mid trim granularity will be lost. One solution to prevent loss of the granularity, as illustrated in FIG. 11, is to have each edge coming from a CCD 100 go to a short TCD 102 with the same number of taps as in the main oscillator 64 to form a mid-trim unit. In another solution to provide a mid-trim unit, as shown in FIG. 12, the output of each tap inside the main oscillator is provided to a multiplexer 104 to enable selecting one of these outputs and to enable dynamically changing which output is used to create an edge provided to the counter/comparator. With either solution, the mid-trim unit includes a circuit to selectively and dynamically change delay for each output edge.

A clock management circuit as described herein can form part of a delay lock loop (DLL) or a digital frequency synthesizer (DFS), for example. For example, embodiments of the clock management circuit as described herein can be used as part of the DLL as described in U.S. Pat. Nos. 6,289,068 and 6,587,534. Similarly, with frequency shifting provided in the CCDs, the clock management circuit can be used as part of the DFS described in U.S. Pat. Nos. 6,384,647 and 6,445,232. Clock management circuits in accordance with the present invention allow a number of clock outputs each with independent phase of the input clock and duty cycle and optionally a different frequency than the input clock.

Although the present invention has been described above with particularity, this was merely to teach one of ordinary skill in the art how to make and use the invention. Many additional modifications will fall within the scope of the invention, as that scope is defined by the following claims.

What is claimed is:

1. A clock circuit, comprising:
  a plurality of clock output blocks, each clock output block being coupled to receive a common clock signal, and each clock output block having an output providing a respective clock signal with a selectable phase delay relative to the common clock signal and other ones of the delay blocks, each clock output block comprising:
    a plurality of counter controlled delay devices (CCDs), each CCD having an input coupled to receive the common clock signal, and further having an output; and
    a latch having a first set input coupled to the output of a first one of the CCDs, and a first reset input coupled to the output of a second one of the CCDs, the latch having an output providing the output of the clock output block,
  wherein each of the CCDs comprises:
    a starter circuit having an input providing the input of the CCD, a reset input, and an output;
    an oscillator having a start input coupled to the output of the starter circuit, a reset input, and an output;
    a counter having a clock input coupled to the output of the oscillator, a reset input, and a count output;
    a sampler register having an input coupled to the count output of the counter, and further having an output providing the output of the CCD and further coupled to the reset inputs of the starter circuit, the oscillator and the counter; and
    a delay element coupling the output of the sampler register to a reset input of the sampler register.

2. The clock circuit of claim 1, wherein the latch further comprises a second set input coupled to an output of a third one of the CCDs, and a second reset input coupled to an output of a fourth one of the CCDs.

3. The clock circuit of claim 1, wherein at least one of the CCDs provides a selectable frequency.

4. A clock circuit, comprising:
  a plurality of clock output blocks, each clock output block being coupled to receive a common clock signal, and each clock output block having an output providing a respective clock signal with a selectable phase delay relative to the common clock signal and other ones of the delay blocks, each clock output block comprising:
    a plurality of counter controlled delay devices (CCDs), each CCD having an input coupled to receive the common clock signal, and further having an output; and
    a latch having a first set input coupled to the output of a first one of the CCDs, and a first reset input coupled to the output of a second one of the CCDs, the latch having an output providing the output of the clock output block, wherein at least one of the CCDs provides a selectable frequency, and
  wherein each of the CCDs comprises:
    a frequency divider having an input coupled to the input of the CCD, the frequency divider selectively dividing a signal applied at the input of the CCD by a number D;
    a starter circuit having an input coupled to the output of the frequency divider, and further having a reset input and an output;

an oscillator having a start input coupled to the output of the starter circuit, and further having a reset input and an output;

a first counter comparator having a clock input coupled to the output of the oscillator, and further having a reset input, a compare value input, and a count output, the counter comparator providing an output transition when a count determined from the clock input equals the compare value input;

value storage registers having an output coupled to the compare value input of the first counter comparator, and further having an input coupled to the count output of the first counter comparator;

a second counter comparator having a clock input coupled to the count output of the first counter comparator, and further having a reset input, a compare value input coupled to receive a multiply value M, and a count output, the counter comparator providing an signal transition at its output when a count determined from the clock input equals the compare value input; and a delay element coupling the count output of the second counter comparator to the reset inputs of the first and second counter comparators, and to the reset inputs of the starter circuit and the oscillator.

5. The clock circuit of claim 4, wherein the value storage register stores values nD/M, wherein n are integer values from 1 to M.

6. The clock circuit of claim 4, wherein each of the first and second counter comparators comprises:

a comparator having a first input coupled to the compare value input of the counter comparator, and further having a second input and an output;

a counter having a clock input coupled to the clock input of the counter comparator, and further having an output coupled to the second input of the comparator;

a flip-flop having a D input coupled to the output of the comparator, a clock input coupled to the clock input of the counter comparator, and an output providing the output of the counter comparator, and a reset input; and a delay element having an input coupled to the output of the flip-flop and an output coupled to the reset input of the flip-flop.

7. The clock circuit of claim 1, further comprising a tap controlled delay device coupling the CCD to the latch.

8. The clock circuit of claim 1, wherein the oscillator comprises:

a plurality of series connected delay elements with taps provided from outputs of the delay elements; and a multiplexer having inputs coupled to the taps, and further having an output providing an output of the oscillator.

9. The clock circuit of claim 3, wherein each of the CCDs comprises:

a frequency divider having an input providing the input of the CCD; and a counter having a clock input coupling the output of the frequency divider to the output of the CCD; and a delay element coupling the output of the counter to a reset input of the counter.

10. The clock circuit of claim 9, wherein each of the CCDs further comprises:

a comparator having a first input coupled to receive a compare value, a second input coupled to an output of the counter, and an output coupled to the output of the CCD.

11. The clock circuit of claim 10, wherein each of the CCDs further comprises:

a D flip-flop having a D input coupled to the output of the comparator, a clock input coupled to the clock input of the counter, a reset input, and an output providing the output of the CCD; and a delay element having an input coupled to the output of the D flip-flop and an output coupled to the reset input of the D flip-flop.

* * * * *